United States Patent Office 2,782,186
Patented Feb. 19, 1957

2,782,186
MONOAZO DYESTUFFS

Ernst Merian, Allschwil, Switzerland, assignor, by mesne assignments, to Saul & Co., Newark, N. J., as nominee of Fidelity Union Trust Company No Drawing. Application September 2, 1952, Serial No. 307,565

Claims priority, application Switzerland September 7, 1951

6 Claims. (Cl. 260—196)

The present invention relates to monazo dyestuffs which dye acetate silk fibers, polyamide fibers and polyester fibers in pure yellow to orange shades, and the dyeings of which are distinguished by excellent fastness to light, washing and sublimation and, additionally, are stable with respect to so-called "gas fumes" (combustion gases).

The monoazo dyestuffs of the present invention correspond to the formula

alkyl—O₂S—R—N=N—R' wherein R stands for a radical of the benzene or naphthalene series which may carry any desired substituents other than the nitro group and water-solubilizing groups, and R' stands for the radical of a tertiary amine of the benzene series, which is free from water-solubilizing groups and the nitrogen atom of which carries one or two cyanoalkyl groups.

The said monoazo dyestuffs can be prepared by coupling 1 mol of the diazo compound of an amine of the benzene or naphthalene series, which contains one alkylsulfone group but no nitro group and no water-solubilizing group, with 1 mol of a tertiary amine of the benzene series, which is free from water-solubilizing groups and the nitrogen atom of which carries one or two cyanoalkyl groups.

Diazotized aminobenzenes containing one alkylsulfone group but no nitro or water-solubilizing groups have heretofore been coupled with tertiary amines of the benzene series. In this connection, use has been made for example of N,N-dimethylaminobenzene, N,N-diethylaminobenzene, N-ethyl-N-hydroxyethylaminobenzene, N-ethyl-N-methoxyethylaminobenzene, and 1-(N,N-dimethoxyethyl)-amino-2-methoxy-5-methylbenzene as azo components, thereby producing yellow to orange-red dyestuffs, some of which dyed acetate silk but only poorly, and the dyeings of which on acetate silk, insofar as these could be obtained at all, were insufficiently fast to light. It is also known that diazotized nitro-aminobenzenes, which contain an alkylsulfone group but no water-solubilizing group, can be coupled with tertiary amines of the benzene series which contain at least one cyanoalkyl group on the nitrogen atom. However, the thus-obtained dyestuffs dye acetate silk in bluish red shades. The shades of these products on polyamide fibers are different from the shades on acetate silk, and the dyeings are greatly inferior with respect to fastness to light.

All the enumerated deficiencies of the prior art—inferior drawing capacity onto acetate silk, deficient fastness to light, and undesired shades on polyamide fibers—are obviated by the monoazo dyestuffs of the present invention. The said monoazo dyestuffs draw well onto acetate silk and dye the latter as well as polyamide fibers in deep pure yellow to orange shades of excellent fastness to light. Moreover, the dyeings are to be characterized as very good from the standpoint of the other aforementioned fastness properties. It is particularly surprising that the introduction of the cyanoalkyl group or groups into the azo component used in the first of the hereinbefore described prior art processes should result in a significant improvement in drawing capacity.

It is a further noteworthy feature of the monoazo dyestuffs of the present invention that they can be used in the shade-in-shade dyeing of mixed fabrics from cellulose acetate and polyamide fibers without impairing fastness to light.

Illustrative of amines of the benzenes and naphthlene series which may be employed in preparing diazo compounds suitable for use in making the monazo dyestuffs of the present invention are, among others, the alkylsulfone - amino - benzenes, alkylsulfone-chloro-aminobenzenes, alkylsulfone-bromo-aminobenzenes, alkylsulfone-fluoro-aminobenzenes, alkylsulfone-alkyl-aminobenzenes, alkylsulfone-fluoro-alkylaminobenzenes, and alkylsulfone-aminonaphthalenes which may be further substituted, etc.

Suitable azo components for coupling with the diazo compounds enumerated in the preceding paragraph are for example N-methyl-N-cyanoethyl-aminobenzene, N-ethyl - N - cyanoethyl - aminobenzene, N-hydroxyethyl-N-cyanoethyl - aminobenzene, N - hydroxypropyl - N-cyanoethyl-aminobenzene, 1-(N-methyl-N-cyanoethyl)-amino-3 - methylbenzene, 1 - (N - ethyl-N-cyanoethyl)-amino-3-methylbenzene, 1 - (N - hydroxyethyl - N - cyanoethyl)-amino-3-methylbenzene, 1 - (N-hydroxypropyl-N-cyanoethyl)-amino-3-methylbenzene, N-methyl-N-cyanomethyl-aminobenzene, N-ethyl-N-cyanomethyl-aminobenzene, N-hydroxyethyl - N - cyanomethyl-aminobenzene, 1-(N-hydroxyethyl - N-cyanomethyl)-amino-3-methylbenzene, N-hydroxybutyl-N-cyanoethyl-aminobenzene, 1-(N-hydroxybutyl - N - cyanoethyl)-amino-3-methylbenzene, 1-(N-methyl-N-cyanoethyl)-amino-3-ethylbenzene, 1-(N-ethyl-N-cyanoethyl)-amino-3-ethylbenzene, 1-(N-hydroxyethyl-N-cyanoethyl)-amino-3-ethylbenzene, etc. All these tertiary amines of the benzene series are to be free from water-solubilizing groups.

The term "water-solubilizing groups" throughout this specification stands for sulfonic and carboxylic acid groups.

The coupling of the diazo compound with the azo component to produce a desired monoazo dyestuff according to the present invention is preferably carried out in acid aqueous medium. The resultant dyestuff, after precipitation thereof, it filtered off, washed and dried.

The following examples illustrate the invention without, however, being restrictive thereof. In the said examples, the parts and percentages are by weight, and the temperatures are in degrees centigrade.

Example 1

10.3 parts of 1-amino-2-chloro-4-methylsulfone-benzene are diazotized at 60° with 3.5 parts of sodium nitrite in 65 parts of concentrated sulfuric acid. The reaction mass is then poured onto 350 parts of ice and 75 parts of water. A solution of 10 parts of N-hydroxyethyl-N-cyanoethyl-aminobenzene in 10 parts of concentrated hydrochloric acid and 25 parts of water is then added dropwise. When the ensuing coupling has terminated, the formed monoazo dyestuff is filtered off, washed free of acid, and dried. It corresponds to the formula

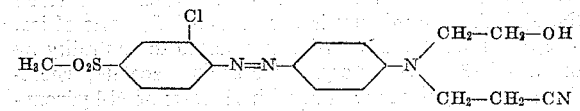

In the form of a dispersion, the said dyestuff dyes acetate silk and polyamide fibers in deep yellowish orange shades of outstanding fastness to light and very good wet-fastness properties.

A dyestuff of similar properties is obtained, when while otherwise proceeding as hereinbefore described in the present example, the 10.3 parts of 1-amino-2-chloro-4-methylsulfone-benzene are replaced by 12.5 parts of 1-amino-2-bromo-4-methylsulfone-benzene.

Example 2

By proceeding as described in the first paragraph of Example 1, except that the azo component therein mentioned is replaced by an equivalent quantity of 1-(N-hydroxyethyl - N - cyanoethyl) - amino - 3 - methylbenzene, there is obtained a similar dyestuff which corresponds to the formula

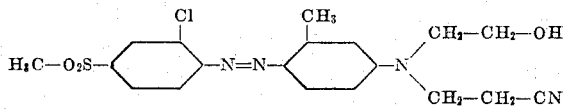

Example 3

If, while otherwise proceeding as described in Example 1, first paragraph, the 10.3 parts of 1-amino-2-chloro-4-methylsulfone-benzene are replaced by 10.3 parts of the isomeric 1-amino-2-methylsulfone-4-chlorobenzene, there is obtained a dyestuff which corresponds to the formula

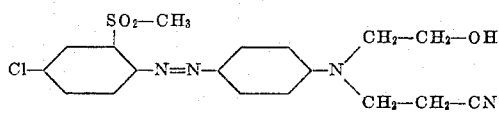

By replacing the azo component of the present example, N-hydroxyethyl-N-cyanoethyl-amino benzene, by 1-(N - hydroxyethyl - N - cyanoethyl) - amino - 3 - ethylbenzene, there is obtained a dyestuff which corresponds to the formula

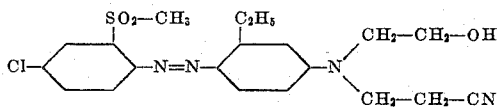

Example 4

12.5 parts of 1-amino-4-bromo-2-methylsulfone-benzene are diazotized after the manner set forth in Example 1. After pouring the diazotization mixture onto ice-water, coupling is effected with 10.5 parts of 1-(N-hydroxyethyl - N - cyanoethyl) - amino - 3 - methylbenzene in solution in 10 parts of concentrated hydrochloric acid and 25 parts of water. The resultant dyestuff corresponds to the formula

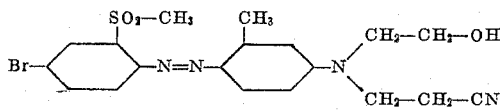

and is isolated by filtering, washing free of acid, and drying. It dyes acetate silk in powerful yellowish orange shades of good fastness to light.

Example 5

5 parts of sodium nitrite are added at 60° to 60 parts of concentrated sulfuric acid. The solution is cooled to 10–20° and, at this temperature, diluted with 65 parts of concentrated acetic acid. 15 parts of 1-amino-4-methylsulfone-naphthalene are then gradually added to the solution at 10–15°, whereupon another 65 parts of concentrated acetic acid are added. At the end of an hour, excess nitrite is neutralized with 3 parts of urea, after which the diazotization mixture is poured onto 750 parts of ice. The thus-produced suspension is adjusted to neutrality by means of 135 parts of crystalline sodium acetate, whereupon coupling is carried out with 13 parts of N-hydroxyethyl-N-cyanoethyl-aminobenzene in solution in 150 parts of water and 14 parts of 30% hydrochloric acid solution. The thus-obtained dyestuff corresponds to the formula

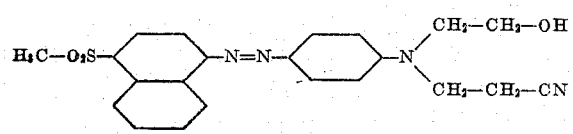

and dyes acetate silk and polyamide fibers in powerful orange shades of very good fastness properties.

Example 6

The procedure set forth in Example 5 is followed, except that the 13 parts of N-hydroxyethyl-N-cyanoethyl-aminobenzene are replaced by 14 parts of 1-(N-hydroxyethyl-N-cyanoethyl)-amino-3-methylbenzene. The dyestuff thus obtained is especially distinguished by the fact that it dyes polyamide fibers in yellowish scarlet shades of extraordinary fastness to light and of very good wet-fastness properties. It corresponds to the formula

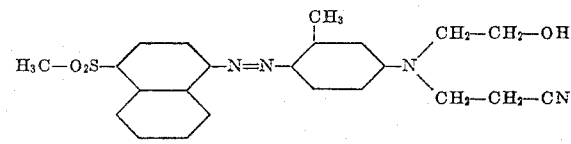

Example 7

17.1 parts of 1-amino-4-methylsulfone-benzene are stirred into 50 parts of concentrated acetic acid, and the mixture then poured onto 150 parts of concentrated acetic acid and 30 parts of 30% hydrochloric acid. Diazotization is then carried out at 0° with the aid of a solution of 7 parts of sodium nitrite in 30 parts of water. 20 parts of N-hydroxyethyl-N-cyanoethyl-aminobenzene are added to the diazo solution, whereupon formation of the dyestuff of the formula

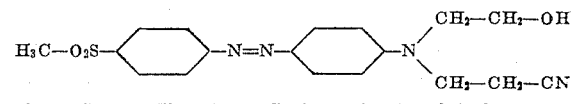

takes place. The dyestuff dyes the hereinbefore-mentioned fibers in reddish yellow shades of very good fastness properties.

Dyestuffs of similar properties as described in the present example are the following:

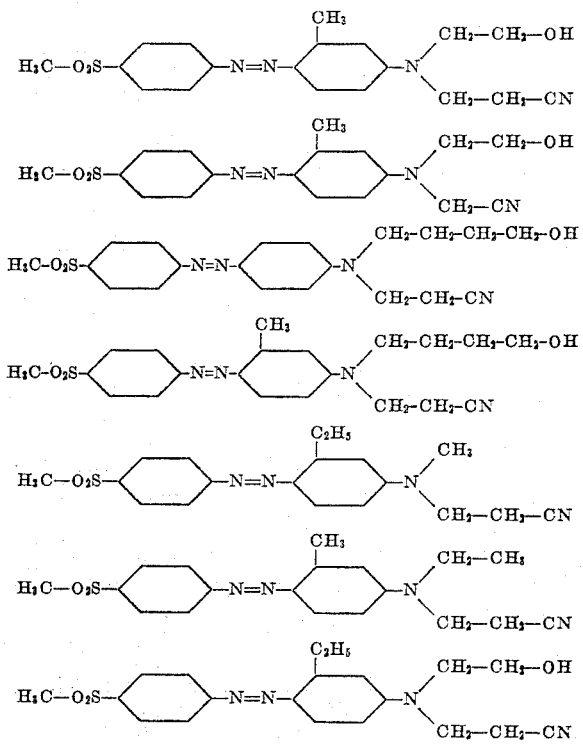

Example 8

5 parts of sodium nitrite are added at 60° to 65 parts of concentrated sulfuric acid. Upon completion of the ensuing formation of nitrosylsulfuric acid, the reaction mixture is diluted with 65 parts of concentrated acetic acid and then 15 parts of 1-amino-5-methylsulfone-naphthalene are added at 10–15°, followed again by 65 parts of concentrated acetic acid. At the end of an hour, excess nitrite is decomposed with 3 parts of urea, and the reaction mixture is poured onto 500 parts of ice and 1500 parts of water. To the thus-obtained diazo solution, there is added dropwise a solution of 13 parts of N-hydroxyethyl-N-cyanoethyl-aminobenzene in 16 parts of 30% hydrochloric acid and 150 parts of water. In a short time, the dyestuff separates out as a dark-red suspension. After isolation (by filtration, washing and drying), the dyestuff dyes acetate silk and polyamide fibers in orange-colored shades.

Example 9

5 parts of sodium nitrite are added at 60° to 65 parts of concentrated sulfuric acid. Upon completion of the formation of nitrosylsulfuric acid, the reaction mixture is diluted with 65 parts of concentrated acetic acid, after which 20 parts of 1-amino-2-bromo-4-methylsulfone-naphthalene are added at 15–20°. The diazo mass is then again diluted with 65 parts of concentrated acetic acid. At the end of an hour, excess nitrite is decomposed with 3 parts of urea, and the entire mixture then poured onto 500 parts of ice and 1500 parts of water. To the thus-obtained diazo solution, there is then added dropwise a solution of 13 parts of N-hydroxyethyl-N-cyanoethyl-aminobenzene in 16 parts of 30% hydrochloric acid and 150 parts of water. There is soon formed a dark-red dyestuff which, worked up as in the previous examples, dyes acetate silk and polyamide fibers in orange-colored shades.

If, while otherwise proceeding as described in the preceding paragraph, the azo component is replaced by 14 parts of 1 - (N - hydroxyethyl-N-cyanoethyl) - amino-3-methylbenzene, a scarlet powder is obtained which dyes acetate silk and polyamide fibers in somewhat redder shades.

Example 10

0.6 part of the dyestuff according to Example 8 is dispersed with the aid of Turkey red oil, and the resultant dispersion used for dyeing 100 parts of acetate silk in a soap bath in the conventional way, preferably at elevated temperature. Pure orange shades of excellent fastness properties are obtained. To enhance the dispersion, the dyestuff may be ground, prior to the dyeing process, with a wetting agent, dispersing agent or emulsifier, preferably in the presence of an inorganic salt such as sodium sulfate.

Example 11

10 parts of a 20% paste of a dyestuff of Example 9 are intimately admixed with 10 parts of diethylene glycol and 80 parts of gum arabic thickener. The resultant printing paste gives, on acetate silk and on polyamide fibers, after steaming, orange prints of excellent fastness properties.

The dyestuff described in Example 8 corresponds to the formula

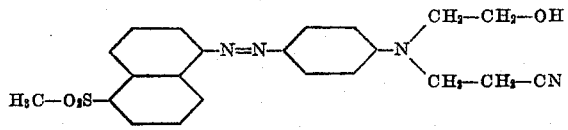

that of Example 9, first paragraph, corresponds to the formula

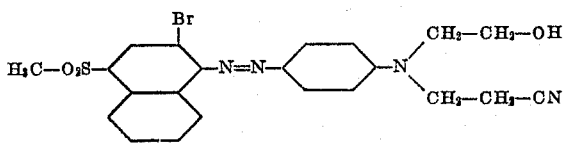

and that of Example 9, second paragraph, corresponds to the formula

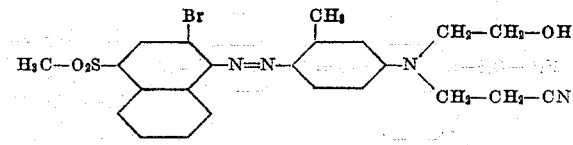

Example 12

By proceeding as described in the first paragraph of Example 1, except that the azo component therein mentioned is replaced by an equivalent quantity of N-hydroxybutyl-N-cyanoethyl-aminobenzene, there is obtained a similar dyestuff which corresponds to the formula

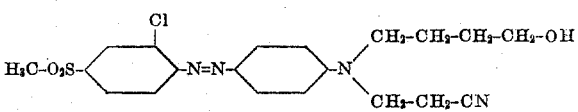

Example 13

If, while otherwise proceeding as described in Example 1, first paragraph, the azo component therein mentioned is replaced by the equivalent quantity of N-hydroxyethyl-N-cyanomethyl-aminobenzene, there is obtained a dyestuff which corresponds to the formula

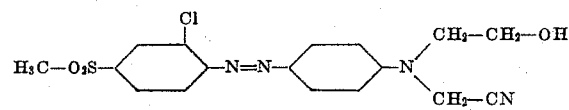

and dyes acetate silk and polyamide fibers in yellowish orange shades.

Having thus disclosed the invention, what is claimed is:

1. A monoazo dyestuff which corresponds to the formula

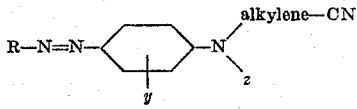

wherein the "alkylene" is a lower alkylene group, R stands for a member selected from the group consisting of radicals of the benzene and naphthalene series which possess in ortho-position to the azo group a substituent selected from the group consisting of H, Cl and Br, and in para-position to the azo group a methylsulfonyl group, R being free of further substituents, y stands for a member selected from the group consisting of hydrogen and lower alkyl, and z stands for a member selected from the group consisting of lower alkyl, lower hydroxyalkyl and lower cyanoalkyl.

2. The monoazo dyestuff which corresponds to the formula

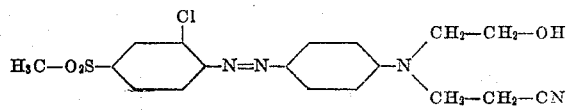

3. The monoazo dyestuff which corresponds to the formula

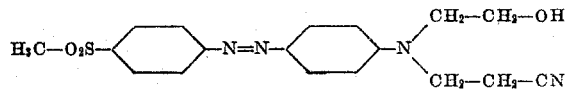

4. The monoazo dyestuff which corresponds to the formula

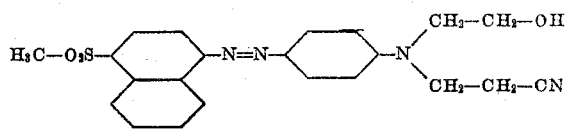

5. The monoazo dyestuff which corresponds to the formula
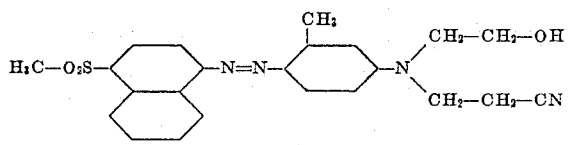
6. The monoazo dyestuff which corresponds to the formula
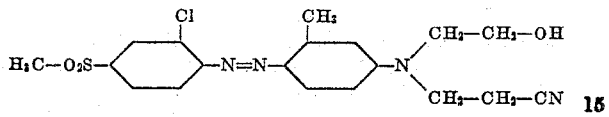
References Cited in the file of this patent
UNITED STATES PATENTS
| | | |
|---|---|---|
| 2,082,156 | Felix et al. | June 1, 1937 |
| 2,156,446 | Bock | May 2, 1939 |
| 2,492,971 | Dickey | Jan. 3, 1950 |
| 2,615,013 | Dickey | Oct. 21, 1952 |
| 2,649,440 | Dickey et al. | Aug. 18, 1953 |